United States Patent [19]
Alberda

[11] Patent Number: 5,370,437
[45] Date of Patent: Dec. 6, 1994

[54] UNIVERSAL IMPACT BEAM TUBE POCKET

[75] Inventor: James A. Alberda, Shelbyville, Mich.

[73] Assignee: Benteler Industries, Inc., Grand Rapids, Mich.

[21] Appl. No.: 109,154

[22] Filed: Aug. 19, 1993

[51] Int. Cl.⁵ ............................................. B60R 27/00
[52] U.S. Cl. ................................... 296/146.6; 296/188
[58] Field of Search .................... 296/188, 189, 146.6; 52/720

[56] References Cited

U.S. PATENT DOCUMENTS

| | | | |
|---|---|---|---|
| 4,210,467 | 7/1980 | Klatzer et al. | 148/12 |
| 4,636,608 | 1/1987 | Palentyn et al. | 219/121 |
| 4,708,390 | 11/1987 | Palentyn et al. | 296/188 |
| 5,118,159 | 6/1992 | Horling et al. | 296/188 |
| 5,123,694 | 6/1992 | DePierre et al. | 296/188 |
| 5,277,470 | 1/1994 | Freeman et al. | 296/146.6 |

Primary Examiner—Joseph Pape
Attorney, Agent, or Firm—Price, Heneveld, Cooper, DeWitt & Litton

[57] ABSTRACT

An elongated, tubular, steel, vehicle door impact beam, each end of which has a convex curvilinear outer surface to form opposite curvilinear, outwardly facing connector surfaces, a steel plate at each end having at least one portion which is generally flat, and having a pair of opposite faces, a pair of elongated beads upstanding from one of these faces of the steel plate, each bead having a convex curvilinear cross section, the beads being spaced from and parallel to each other, defining elongated, adjacent, mutually facing, curvilinear surfaces engaging the opposite curvilinear, outwardly facing surfaces of the tubular impact beam, and each curvilinear bead surface being welded to one of the curvilinear beam surfaces of one of the beam ends. The beads are formed from the steel plate, each having a radius of curvature smaller than the radius of curvature of the ends of the beam. The mutually facing curvilinear bead surfaces are spaced apart an amount less than the diameter of the beam end.

6 Claims, 2 Drawing Sheets

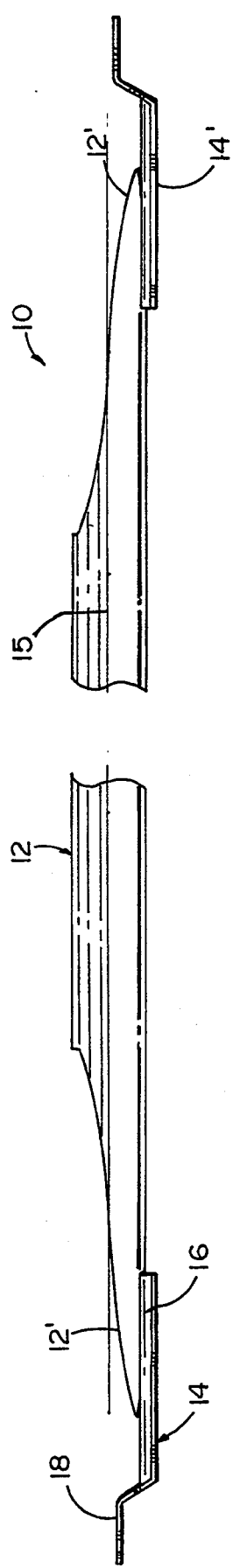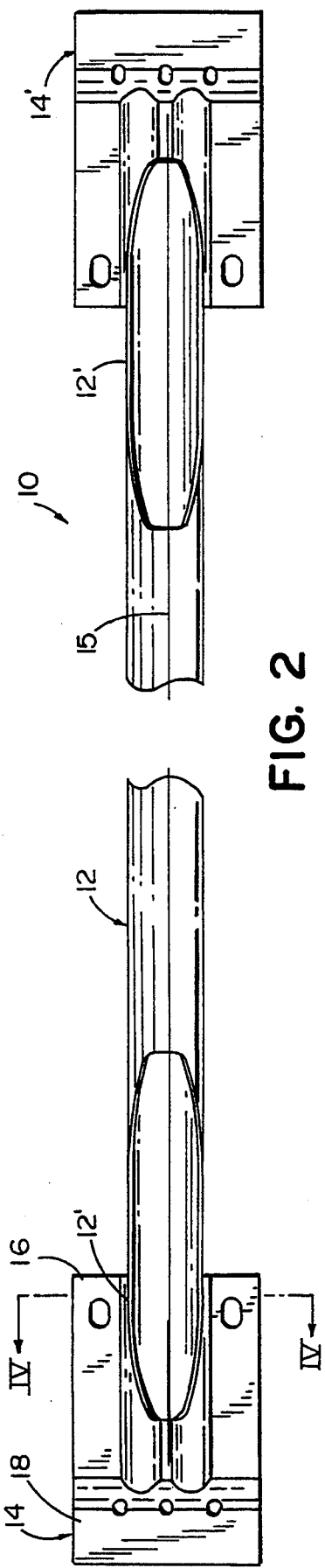

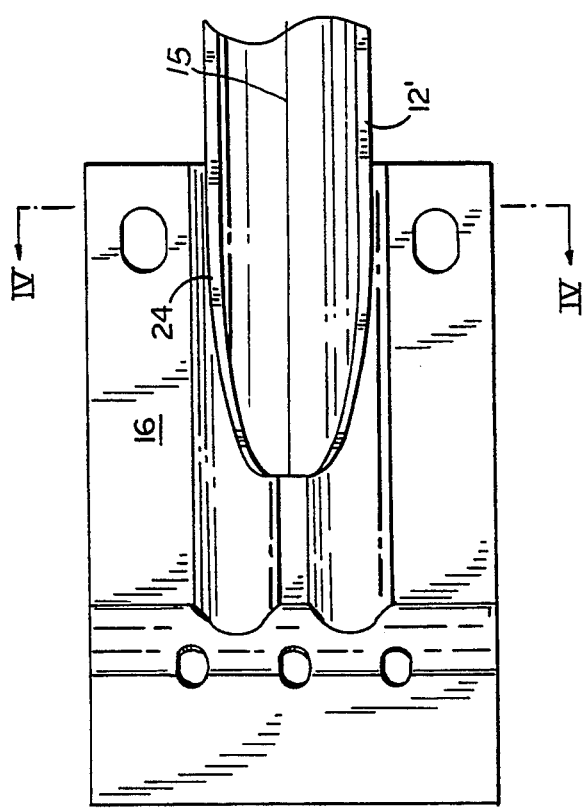
FIG. 3
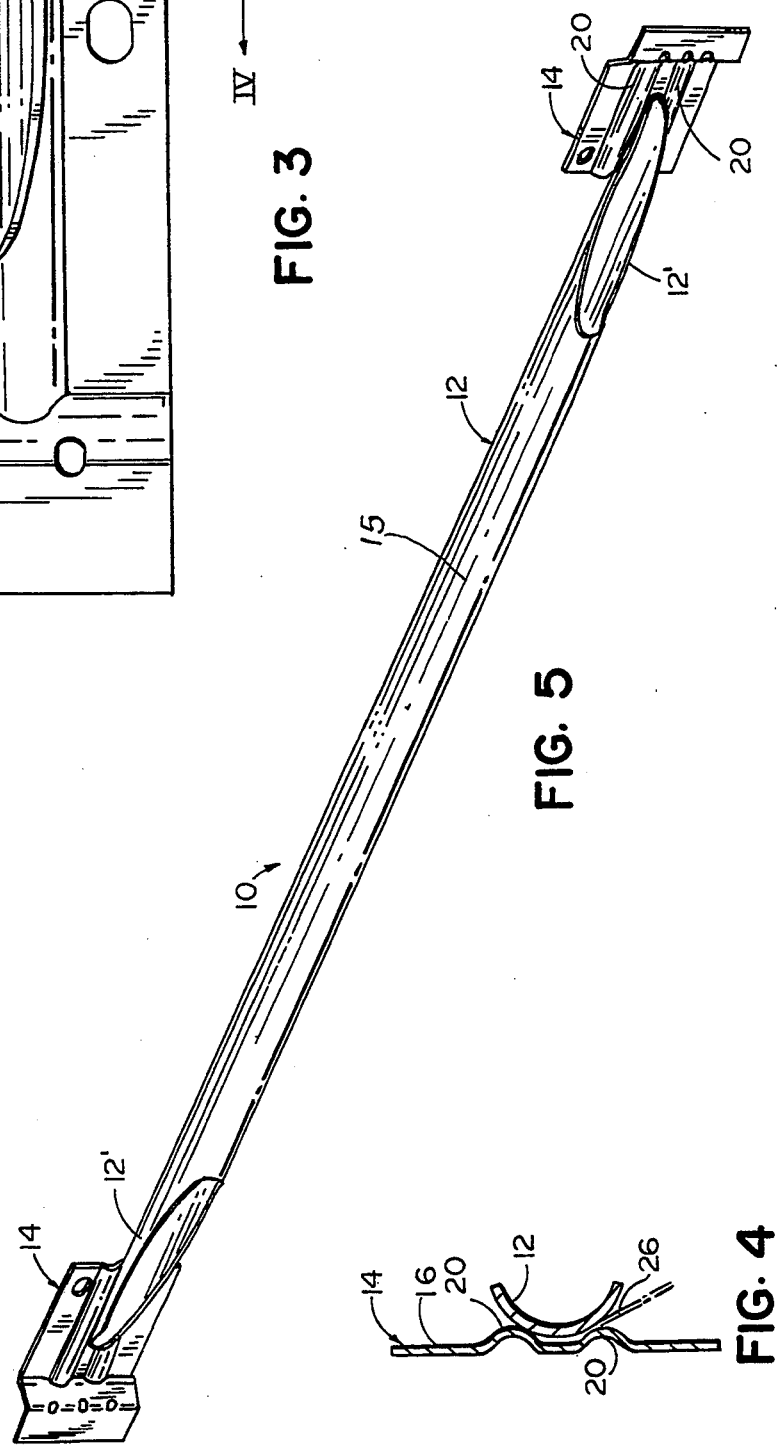
FIG. 5
FIG. 4

UNIVERSAL IMPACT BEAM TUBE POCKET

BACKGROUND OF THE INVENTION

This invention relates to a vehicle impact door beam assembly, and particularly to a unique bracket or extension of an impact tubular door beam assembly.

In meeting the requirements of the federal government, enacted in the Federal Motor Vehicle Safety Standard 214 (FMVSS 214), which mandate installation of door impact beams in vehicle side doors so as to have certain minimum impact resistance, a tubular beam having a steel composition such as that in U.S. Pat. No. 4,210,467 is mounted between the inner and outer door panels. Employees of the assignee herein have developed various tubular door beam configurations heretofore as set forth in U.S. Pat. Nos. 4,636,608, 4,708,390, 5,118,159, and 5,123,694, such beams having their ends secured to brackets (commonly called extensions) which are in turn mounted to the door. To accommodate the convex tubular configuration, these brackets have a concave recess of the same configuration as the tube and the same diameter as, or slightly larger than, the diameter of the convexly curved door beam tube ends. The convex and concave size correlation must be close in order to assure an effective weld bond between the tube and bracket, and thereby assure proper impact protection to the vehicle passenger. These concave recesses are formed by a pair of stamping dies.

Different vehicles employ different diameter door beam tubes, because of different door lengths, door configurations and/or other factors. Each different door beam tube diameter necessitates a different size recess in the mounting brackets and hence a different set of stamping dies. Dies of this type presently typically cost about $50,000-$60,000 or more per set. Therefore, a working inventory of dies amounts to a very substantial cost investment by the manufacturer. Assembly of the tubular beams to the conventional brackets also normally requires a programmed welding robot because of the different angles of the welding seam. The total capital investment is very large, therefore.

SUMMARY OF THE INVENTION

An object of this invention is to provide a door beam mounting bracket capable of interfitting with and mounting impact door beam tubes of different diameters without sacrificing impact effectiveness, and a novel combination of this bracket and a tubular door beam. The same novel bracket can be used for a range of door beam diameters, thereby greatly reducing the stamping die inventory and equipment investment cost.

The novel bracket structure also adds strength to the bracket, as well as accommodating a range of door beam tubes of different sizes. The bracket is a plate which is generally flat, or at least has a generally flat portion into which are formed a pair of longitudinal, spaced, parallel, upstanding beads of convex curvilinear cross section and of a radius substantially smaller than the radius of a tube beam fitted therewith. The spacing between adjacent, facing surfaces of these beads is less than the maximum and minimum diameter beam tubes of the diameter range to be fitted, and almost as large as the minimum diameter tube of the range, so that a pair of side welds between the tube and each bead of the bracket are near the neutral axis or plane of the center line of the tube, i.e., not significantly on the tension side or the compression side of the beam. The height of the beads is also a fraction of the tube diameter.

This novel bracket is not only capable of accommodating a range of tube diameters, and is of improved strength, but also enables welding connection between the beam and bracket to be achieved without a programmed robot.

These and other objects, advantages and features of the invention will become apparent upon studying the following specification in conjunction with the drawings.

BRIEF DESCRIPTION OF THE DRAWINGS

FIG. 1 is a top plan view of the door beam and bracket assembly utilizing this invention;

FIG. 2 is a side elevational view of the assembly in FIG. 1;

FIG. 3 is an enlarged view of the left end portion of FIG. 2;

FIG. 4 is a sectional view taken on plane IV—IV of FIG. 2 or FIG. 3; and

FIG. 5 is a diagrammatic, isometric view of the assembly in FIGS. 1 and 2.

DESCRIPTION OF THE PREFERRED EMBODIMENT

Referring now to the drawings, the door beam assembly 10 there depicted includes an elongated, tubular, steel door beam 12 and a pair of steel mirror image brackets or extensions 14 and 14' to which the beam is secured by welding.

Impact door beam 12 is shown to have a configuration generally comparable to that set forth in prior U.S. Pat. No. 5,118,159, employing contour cut ends 12', with all portions of the cut ends having a moment capacity at least equal to the bending moment. The tubular beam is basically cylindrical in configuration, having a neutral center line axis 15, a diameter and a radius. Although the contoured ends have portions removed, the portions remaining still have the same diameter and radius. The two ends of the beam are welded to the respective brackets 14 and 14' in a manner to, be described.

Each bracket 14 is a steel plate having opposite faces and either being generally flat or having a portion 16 which is generally flat. The offset outer end 18 of the depicted bracket is formed to accommodate a particular door style, spacing between the inner and outer panels of the vehicle door, and location of the door member to which the bracket is to be attached. This attachment is typically done with bolts or by welding. In the embodiment depicted, there are openings through the bracket for optional bolted attachment.

Into flat portion 16 is formed a pair of elongated spaced beads 20 both extending out from one face of bracket 14. These beads and other offset features of the bracket are preferably formed by stamping dies. These beads are shown to extend substantially the length of flat portion 16 of bracket 14. The outer surfaces of these beads are convexly curvilinear in cross section, with each bead having as small a radius as possible considering the practicalities of the stamping dies. The diameter of each bead is substantially smaller than the minimum diameter of the tube to be affixed thereto.

The typical range of impact beam outer diameters to be accommodated is about 25 to about 40 millimeters, with the most common being 25 to 36 millimeters. The tubular configuration of the impact beam presents opposite, curvilinear, outwardly facing connector surfaces to the beads on the bracket. The spacing of the beads or ribs 20 is purposely limited to an amount such that the inside, convex curvilinear abutment surfaces facing each other are spaced apart a small amount less than the smallest diameter tubular door beam of 25 millimeters, such that the line of engagement of the impact beam with each of the elongated beads or ribs 20 is fairly close to the neutral plane of the neutral axis of the center line of the beam, i.e, are only a small amount on tire tensile side of the beam. The two components are fusion welded together, normally MIG welded, at the contact lines between the curvilinear convex beam and the two curvilinear convex beads. These weld seams are shown at 24 in FIG. 3. The interengagement of the tube ends to beads 20 should be accurate enough that the spacing 26 between any portion thereof is less than 0.75 millimeters. A desired minimum length from the end of the tube to where the weld 20 begins is about 20-25 millimeters. Thus, if a 30 millimeter length weld is desired, a total length of 55 millimeters minimum of pocket length is required along beads 20.

Those persons familiar with this field of technology may well visualize additional advantages not specifically enumerated, and obvious variations to accommodate particular vehicles or situations, to that set forth above as the preferred embodiment. This preferred embodiment is intended to be merely illustrative of the invention which is intended to be limited only by the scope of the appended claims and the reasonably equivalent structures to those defined therein.

The embodiments of the invention in which an exclusive property or privilege is claimed are defined as follows:

1. A vehicle door impact beam and bracket combination comprising:
   an elongated tubular steel impact beam having a pair of ends, each end having a convex curvilinear outer surface to form curvilinear, radially outwardly facing connector surfaces at opposite ends of the beam;
   a steel plate at each said beam end having at least one portion which is generally flat, and having a pair of opposite faces;
   a pair of elongated beads upstanding from one of said faces of said plate;
   said beads each having a convex curvilinear cross section;
   said beads being spaced from and parallel to each other, defining elongated, adjacent, mutually facing, curvilinear surfaces engaging said opposite curvilinear, outwardly facing surfaces of said tubular impact beam; and
   each of said curvilinear bead surfaces being welded to one of said curvilinear beam surfaces of one of said beam ends.

2. The vehicle door impact beam and bracket combination in claim 1 wherein said beads are formed from said steel plate, and each have a radius of curvature, said beam ends also having a radius of curvature, said bead radius of curvature being smaller than said beam end radius of curvature.

3. The vehicle door impact beam and bracket in claim 2 wherein said mutually facing curvilinear bead surfaces are spaced apart an amount less than the diameter of said beam end.

4. A vehicle door, tubular impact beam bracket for interfitting with tubular impact door beams of a range of diameters and having a convexly curved peripheral surface, comprising:
   a steel plate having at least one portion which is generally flat, and having a pair of opposite faces;
   a pair of beads upstanding from one of said faces of said plate;
   said beads each having a convex curvilinear cross section;
   said beads being spaced from and parallel to each other, defining elongated, adjacent, mutually facing, curvilinear surfaces for engaging with and bonding to the curved peripheral surface of a tubular impact beam.

5. The vehicle door, tubular impact beam bracket in claim 4 wherein said elongated beads are spaced from each other an amount resulting in said adjacent, opposing, curvilinear surfaces being spaced apart an amount less than the exterior diameter of the largest tubular door beam of said range of diameter, and a small amount less than the smallest tubular door beam of said range such that the engagement of a door beam and said beads is close to the neutral plane of the centerline of the beam.

6. The vehicle door, tubular impact beam bracket in claim 5 wherein said beads are integrally formed from said steel plate and have a radius of curvature substantially smaller than the radius of curvature of a tubular beam in said range of diameters.

* * * * *

UNITED STATES PATENT AND TRADEMARK OFFICE
CERTIFICATE OF CORRECTION

PATENT NO. : 5,370,437
DATED : December 6, 1994
INVENTOR(S) : James A. Alberda

It is certified that error appears in the above-indentified patent and that said Letters Patent is hereby corrected as shown below:

Column 1, line 57;
        "fiat" should be -- flat -- (both occurrences);

Column 2, line 42;
        After "to" delete -- , --;

Column 3, line 10;
        "tire" should be -- the --.

Signed and Sealed this

Twenty-ninth Day of August, 1995

*Attest:*

BRUCE LEHMAN

*Attesting Officer*      *Commissioner of Patents and Trademarks*